United States Patent
Motohashi

(10) Patent No.: US 7,355,619 B2
(45) Date of Patent: Apr. 8, 2008

(54) MOBILE VIDEOPHONE TERMINAL

(75) Inventor: Teruyuki Motohashi, Tokyo (JP)

(73) Assignee: NEC Corporation, Minato-ku, Tokyo (JP)

( * ) Notice: Subject to any disclaimer, the term of this patent is extended or adjusted under 35 U.S.C. 154(b) by 676 days.

(21) Appl. No.: 10/758,534

(22) Filed: Jan. 16, 2004

(65) Prior Publication Data

US 2004/0145654 A1 Jul. 29, 2004

(30) Foreign Application Priority Data

Jan. 21, 2003 (JP) ............................. 2003-012734

(51) Int. Cl.
*H04N 7/14* (2006.01)
(52) U.S. Cl. ............................. 348/14.02; 348/14.01; 455/556.1
(58) Field of Classification Search .. 348/14.01–14.08, 348/14.1, 14.11, 14.12, 14.13; 382/284; 455/556.1, 556.2, 550.1
See application file for complete search history.

(56) References Cited

U.S. PATENT DOCUMENTS

2002/0122605 A1 9/2002 Chang

FOREIGN PATENT DOCUMENTS

| DE | 100 04 348 A1 | 8/2001 |
|---|---|---|
| EP | 1 241 860 A1 | 9/2002 |
| JP | 4-150686 | 5/1992 |
| JP | 2000-172611 | 6/2000 |
| JP | 2000-175166 | 6/2000 |
| JP | 2000-332904 | 11/2000 |
| JP | 2001-102994 | 4/2001 |
| JP | 2002-41057 | 2/2002 |
| JP | 2002-118649 | 4/2002 |
| JP | 2002-354147 | 12/2002 |
| JP | 2002-374508 | 12/2002 |
| WO | WO 00/72577 A1 | 11/2000 |
| WO | WO 03/005717 A1 | 1/2003 |

OTHER PUBLICATIONS

European Search Report dated Mar. 26, 2004.
Japenese Office Action dated Apr. 27, 2007 with partial English translation.

*Primary Examiner*—Melur Ramakrishnaiah
(74) *Attorney, Agent, or Firm*—Mc Ginn IP Law Group, PLLC.

(57) ABSTRACT

A mobile videophone terminal capable of transmitting display information obtained through data communication and the like to a receiving end while talking on the videophone to display it at both ends in real time. The mobile videophone terminal simultaneously performs voice communication and video communication using a still image or, a moving image. Further, the mobile videophone terminal has a multiaccess function for performing videophone communication and data communication at the same time. The mobile videophone terminal at a transmitting end transmits display information obtained through data communication by the use of the multiaccess function or display information in which the display information thus obtained is combined with another display information as a transmitting image to a receiving end. By this means, it becomes possible to share the display information obtained by the use of the multi-access function with each other in real time.

48 Claims, 9 Drawing Sheets

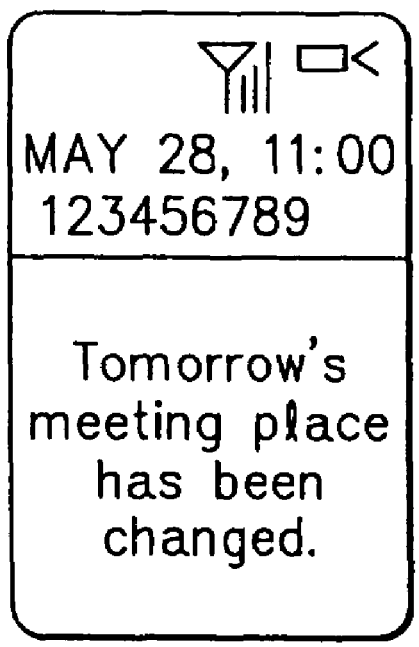
FIG. 1A
PRIOR ART
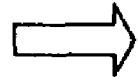
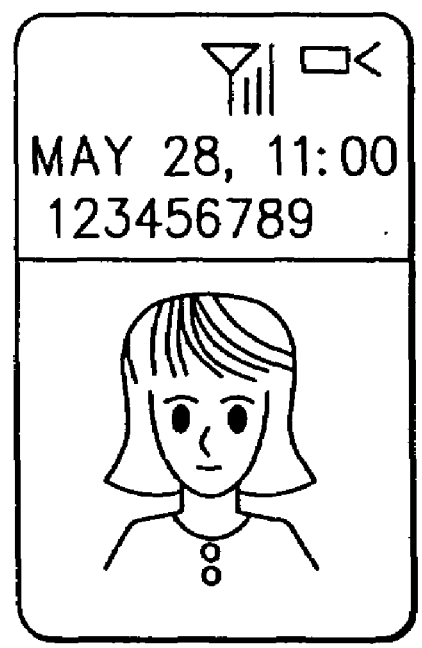
FIG. 1B
PRIOR ART

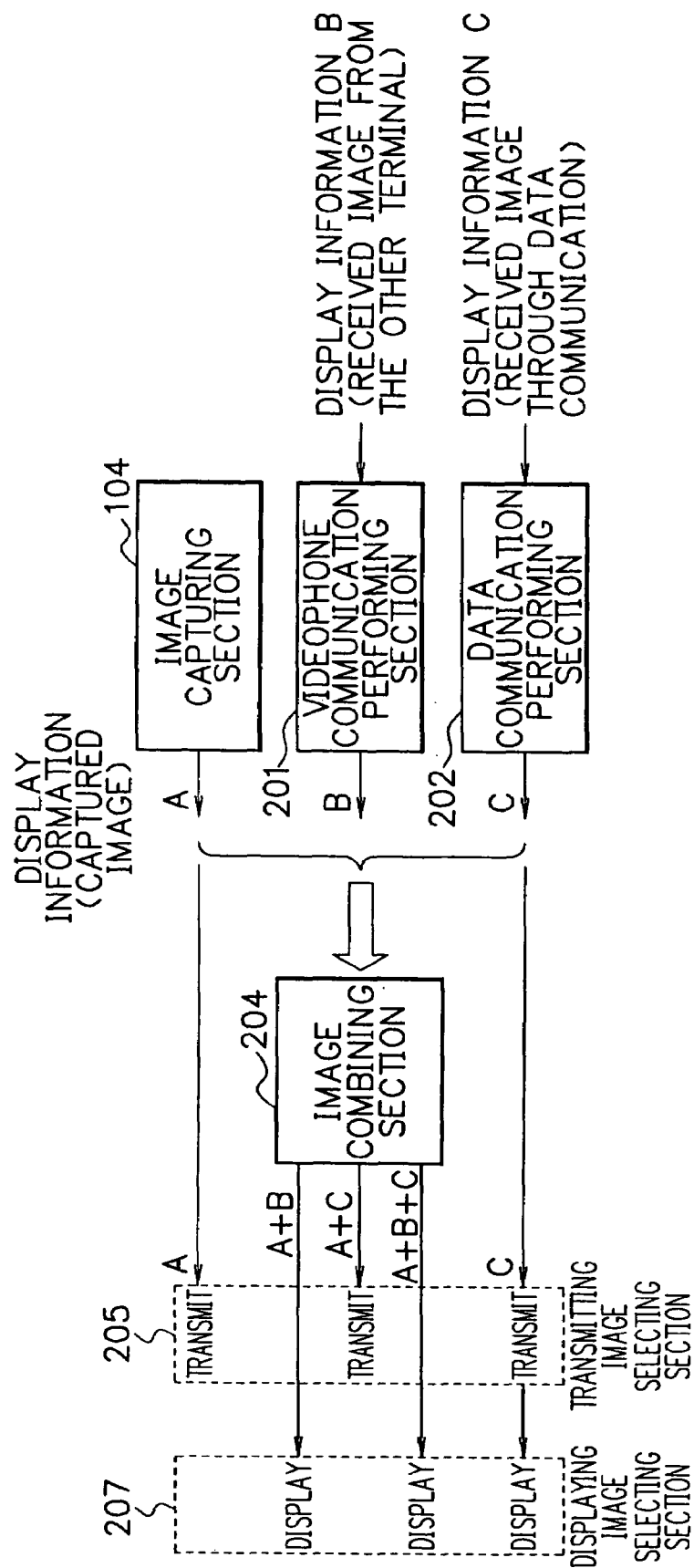

FIG. 6A  FIG. 6B  FIG. 6C

<EXAMPLES OF DISPLAY SCREENS OF TRANSMITTING TERMINAL>

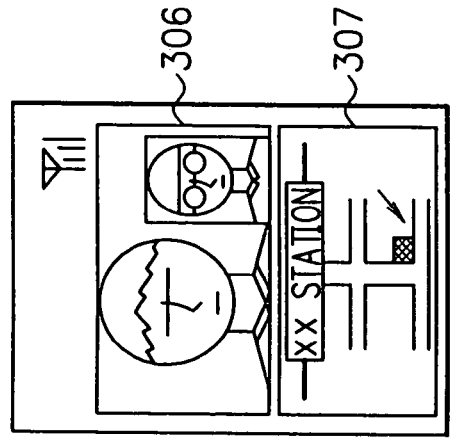
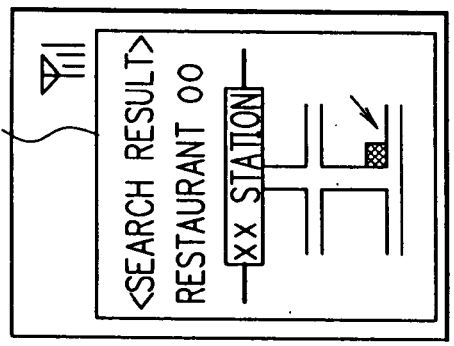
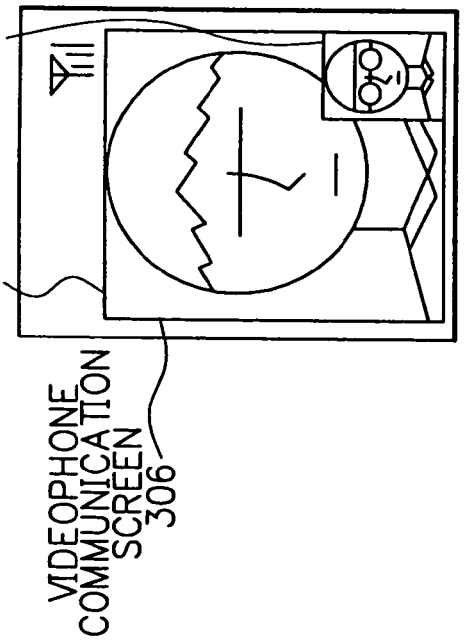

FIG. 6A: SCREEN EXAMPLE DURING VIDEOPHONE COMMUNICATION
- RECEIVING TRANSMITTING SCREEN 304
- VIDEOPHONE COMMUNICATION SCREEN 305
- VIDEOPHONE COMMUNICATION SCREEN 306

FIG. 6B: SCREEN EXAMPLE DURING DATA COMMUNICATION
- DATA-COMMUNICATION SCREEN 307
- <SEARCH RESULT> RESTAURANT ○○

FIG. 6C: SCREEN EXAMPLE DURING MULTIACCESS COMMUNICATION (VIDEOPHONE COMMUNICATION + DATA COMMUNICATION)
- 306
- 307

‹EXAMPLES OF TRANSMITTING IMAGES›

VIDEOPHONE TRANSMITTING IMAGE 404

TRANSMITTING IMAGE EXAMPLE DURING VIDEOPHONE COMMUNICATION

DATA-COMMUNICATION TRANSMITTING IMAGE 405

TRANSMITTING IMAGE EXAMPLE DURING DATA COMMUNICATION 404
405

TRANSMITTING IMAGE EXAMPLE OF COMPOSITE IMAGE (VIDEOPHONE COMMUNICATION + DATA COMMUNICATION)

SCREEN EXAMPLE DURING VIDEOPHONE COMMUNICATION

SCREEN EXAMPLE DURING DATA COMMUNICATION

SCREEN EXAMPLE DURING MULTIACCESS COMMUNICATION (VIDEOPHONE COMMUNICATION + DATA COMMUNICATION)

<EXAMPLES OF DISPLAY SCREENS OF RECEIVING TERMINAL>

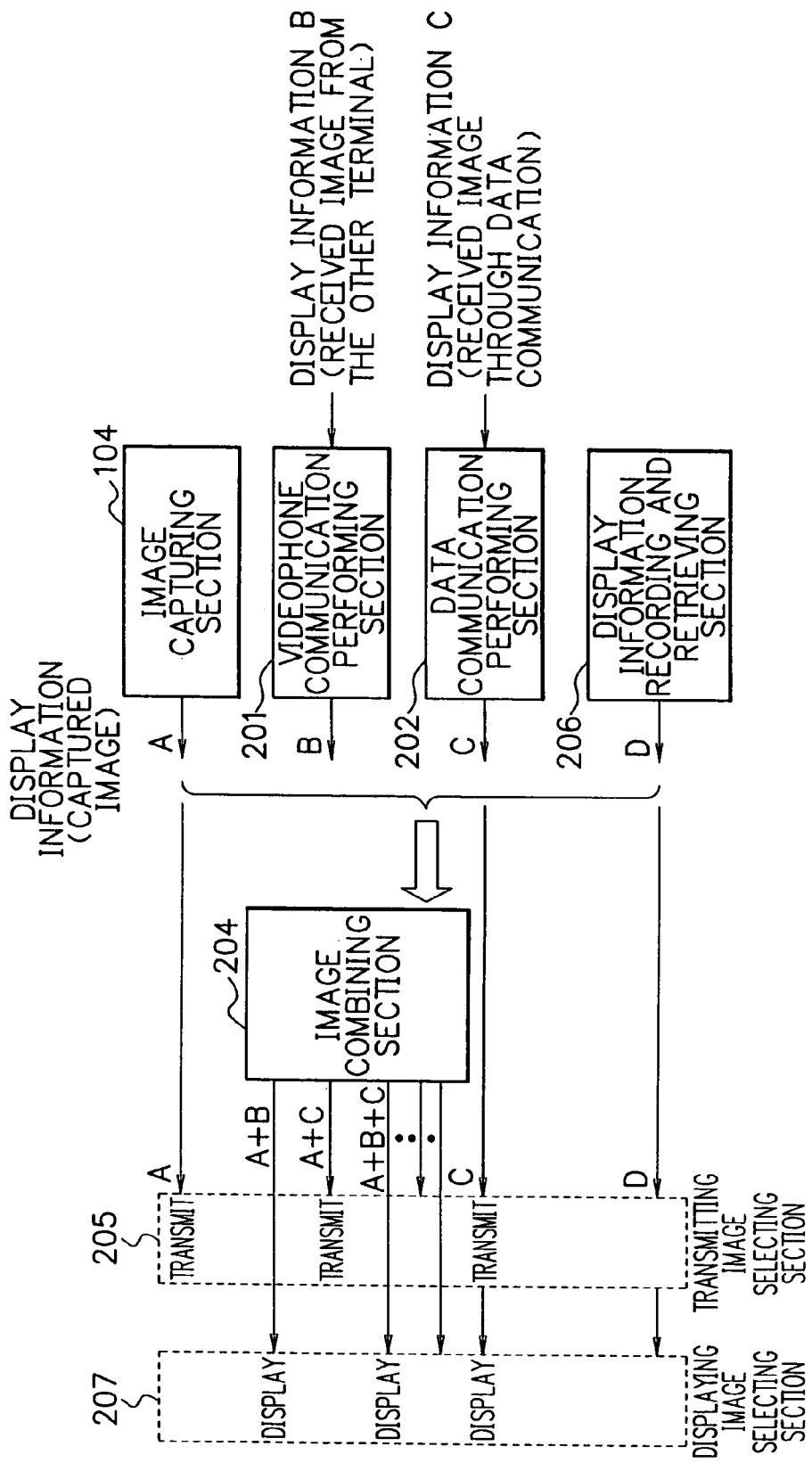

MOBILE VIDEOPHONE TERMINAL

BACKGROUND OF THE INVENTION

The present invention generally relates to mobile videophone terminals, and in particular, to a mobile videophone terminal capable of exchanging and displaying various data while talking on the videophone.

DESCRIPTION OF THE RELATED ART

Recently, many kinds of mobile phones have been proposed. For example, there is proposed in Japanese Patent Application Laid-Open No. 2000-332904 a mobile terminal for transmitting and receiving e-mails into which an image is attached. For another example, there is proposed in Japanese Patent Application Laid-Open No. 2000-175166 a videophone terminal such as a mobile-type videophone, etc. for hiding a part of a background of an image captured by a camera mounted in the mobile phone by superimposing another image thereon.

The mobile terminal proposed in the former document has a function to multiplex audio information and video information and demultiplex the multiplexed information to realize videophone function. Further, the mobile terminal is provided with a mail composing section for composing not only a text mail but also a text mail attached with an image captured by the camera, and a function to transmit and receiving the data.

FIGS. 1A and 1B are diagrams each showing a display screen of the mobile terminal proposed in the former document. First, the mail composing section in the mobile phone composes an image-attached e-mail and transmits it to a receiving mobile terminal. When the receiving mobile terminal receives the image-attached e-mail, a user of the mobile phone operates the keys to display the message in the received e-mail as shown in FIG. 1A, and further operates the keys to display the image in the received mail as shown in FIG. 1B in place of the message of FIG. 1A.

FIG. 2A is a block diagram showing the videophone terminal proposed in the latter document. FIG. 2B schematically shows image-combining processes by the mobile videophone terminal. The videophone terminal is capable of superimposing an image on a moving image used for videophone communication to hide the background which a transmitter does not wish to show. This videophone terminal comprises a camera section 11, an image combining section 12, an input means 13, and a videophone processor 14. The camera section 11 captures images such as a still image and a moving image. The image combining section 12 superimposes an image over the captured images, and output it to the videophone processor 14. The input means 13 inputs the image to be used for concealment to the image combining section 12. A user at the transmitting end intentionally hides a part of the background of the captured self-portrait moving image by the concealing image (picture-frame image) so as not to show the transmitting place.

However, the mobile terminal proposed in the former document is provided only with the function to compose the image-attached mail in addition to the function to compose a text mail. Further, the mobile terminal cannot transmit the mail attached with the image captured by a camera mounted in the mobile phone while the user is talking on the mobile terminal. On the other hand, the videophone terminal proposed in the latter document is only intended to hide the reflecting background. Further, the videophone terminal cannot transmit and receive various data while talking on the videophone to share the data with each other since there is a limit to the transmission and reception of information.

SUMMARY OF THE INVENTION

It is therefore an object of the present invention to provide a mobile videophone terminal capable of sharing information retrieved through data communication, etc. with a mobile terminal on the receiving end during video communication.

More specifically, it is an object of the present invention to provide a mobile videophone terminal capable of retrieving an image data, etc. through a network using multitask function, transmitting the retrieved data to the mobile terminal on the receiving end, and displaying the information on the displays of the mobile phones on the both sides while talking on the videophone.

According to the present invention, there is provided a mobile videophone terminal having a function to simultaneously performing video communication (talking on the videophone) and data communication. This function is normally referred to as a multiaccess function, multi-call function, and the like, and hereinafter referred to as a multiaccess communication function. This multiaccess communication function is practically performed by, for example, FOMA by NTT DoCoMo, Inc. By using this multiaccess communication function, it becomes possible to perform video communication using a still image and a moving image simultaneously with performing voice communication. The mobile videophone terminal according to the present invention activates the multiaccess communication function to transmit an image data, etc. obtained through data communication during the video communication to a receiving end as a transmitting image, or to transmit the obtained image data combined with another image data. Accordingly, it becomes possible to share the image data (text data, a still image and/or a moving image) on the both ends in real time.

Further, also when the multiaccess communication function is not used, it becomes possible to transmit display information such as text data (text information), a still image and a moving image that has been stored in the mobile videophone terminal to the receiving end as a transmitting image. Moreover, it is also possible to combine the stored display information with another display information and to transmit it to the receiving end. Accordingly, it becomes possible to share various information on the both sides of the communication in real time.

According to the present invention, there is provided a mobile videophone terminal for performing video communication using a still image or a moving image, comprising an image capturing means (for example, 104 in FIG. 3) for capturing display information of a still image or a moving image, a videophone communication performing means for performing videophone communication with a receiving end, a data communication performing means for retrieving display information such as text information and an image through a predetermined base station, an image combining means for generating display information by combining at least two selected from the display information obtained by the image capturing means, the videophone communication performing means, and the data communication performing means, respectively, a transmitting image selecting means for inputting therein the display information obtained by the image capturing means, the data communication performing means and the image combining means, respectively, to select and transmit one of the display information as a transmitting image to the receiving end, and a displaying image selecting means for selecting and displaying one of the display information as a displaying image. Further, the mobile videophone terminal comprises a multiaccess communication performing means for simultaneously activating the videophone communication performing means and the data communication performing means. Furthermore, the mobile videophone terminal comprises a memory means (for example, 102 in FIG. 3) for storing various display information. The image combining means further generates display information by combining the display information that has been stored in the memory means with another display information.

To be concrete, the mobile videophone terminal according to the present invention comprises a control section (101 in FIG. 3). The control section performs a control of a videophone communication function of at least transmitting at least an image captured by the image capturing section (104 in FIG. 3) to a receiving end and displaying an image from the receiving end on the displaying section (105 in FIG. 3). The control section performs data communication with a predetermined base station through a network to retrieve display information such as text information and image while performing video communication. Moreover, the control section displays the obtained display information on the display section. Furthermore, the control section combines the obtained information with a still image or a moving image captured by the capturing section and transmits the composite image to the receiving end as a transmitting image. Otherwise, the control section transmits the display information obtained through the data communication to the receiving end in place of transmitting the image captured by the image capturing section.

By the mobile videophone terminal having the multiaccess communication function, it becomes possible to receive various kinds of information through data communication while performing voice communication and video communication with a receiving end. Further, it is also possible to transmit the information received through data communication to the receiving end while performing video communication.

BRIEF DESCRIPTION OF THE DRAWINGS

The objects and features of the present invention will become more apparent from the consideration of the following detailed description taken in conjunction with the accompanying drawings in which:

FIGS. 1A and 1B are diagrams each showing a display screen of a conventional mobile terminal;

FIG. 5 is a diagram showing combinations for composite images and operations to select a transmitting image and a displaying image;

FIGS. 6A to 6C are diagrams each showing an example of a display screen of a transmitting mobile videophone terminal according to the embodiment;

FIG. 9 is a diagram for explaining a case of retrieving a still image or a moving image that has been stored in a memory to be used for a transmitting image.

DESCRIPTION OF THE PREFERRED EMBODIMENTS

Figure 2A:
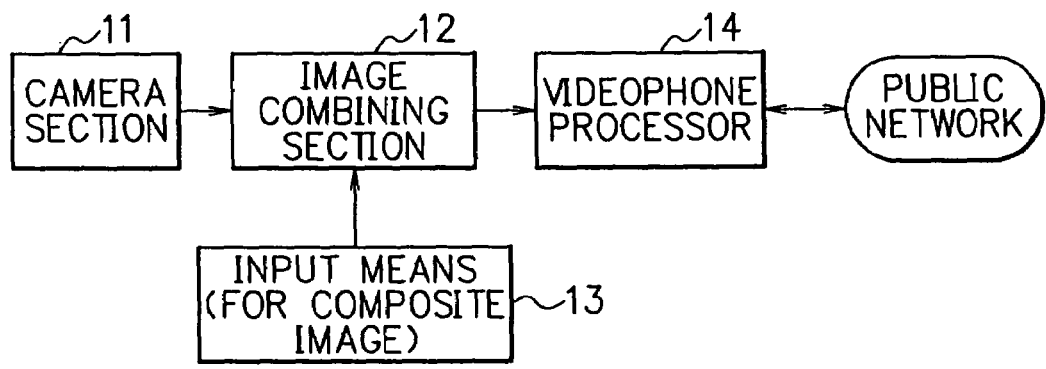
FIG. 2A is a block diagram showing a configuration of a conventional videophone terminal.
Figure 2B:
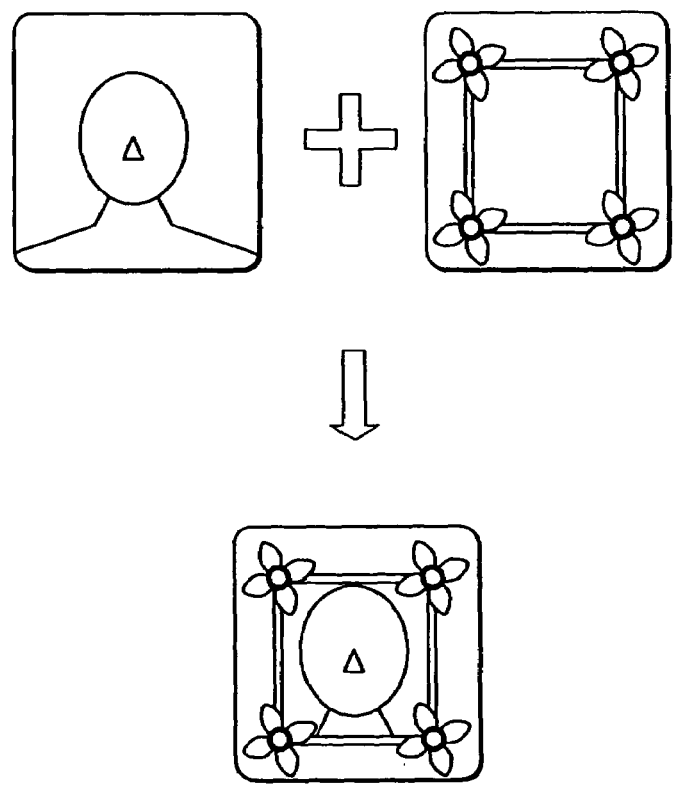
FIG. 2B is a diagram schematically showing image-combining processes by the conventional videophone terminal.

Referring now to the drawings, embodiments of the present invention are explained in detail.

First, an embodiment of a mobile videophone terminal of the present invention is explained in detail.

Figure 3:
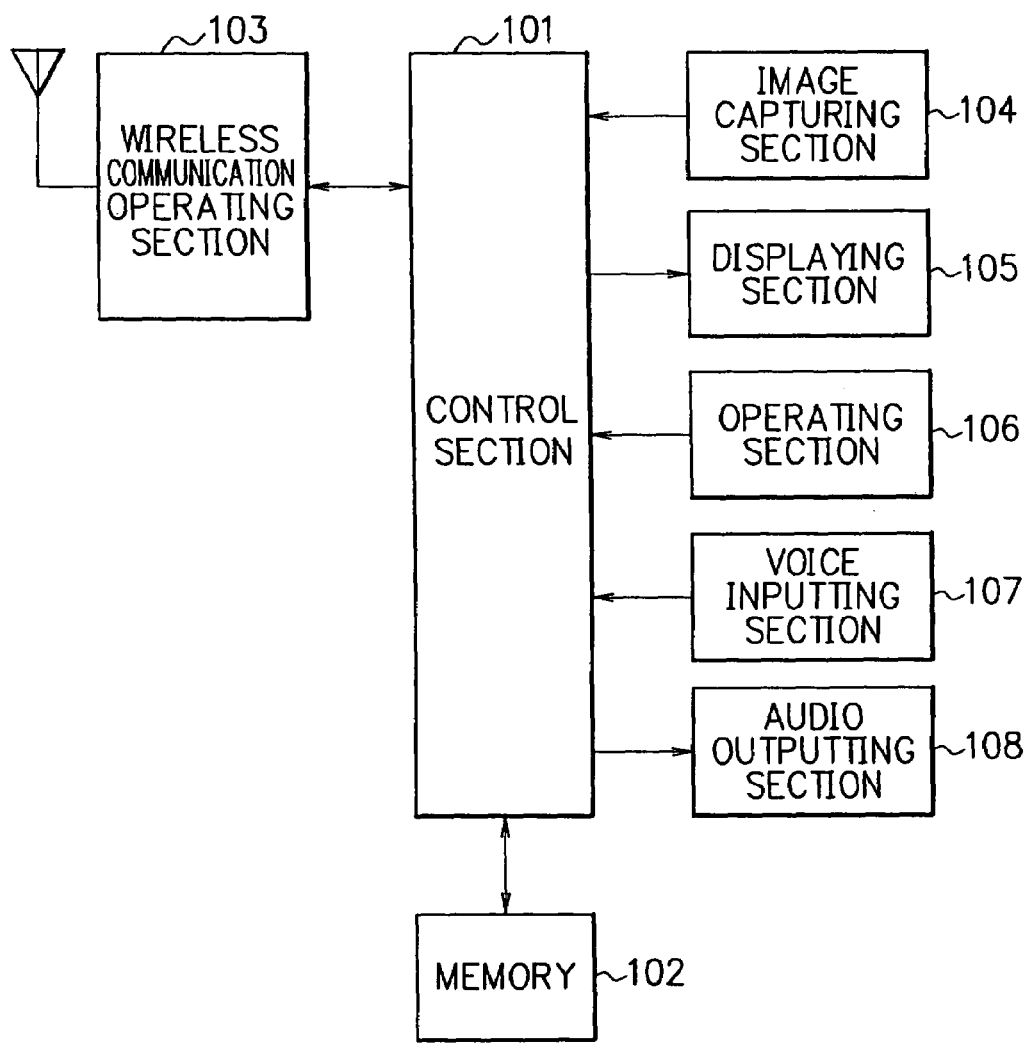
FIG. 3 is a block diagram showing a configuration of a mobile videophone terminal according to an embodiment of the present invention.

FIG. 3 is a block diagram showing a configuration of a mobile videophone terminal according to an embodiment of the present invention. The mobile videophone terminal comprises a control section 101, a memory 102, a wireless communication operating section 103, an image capturing section 104, a displaying section 105, an operating section 106, voice inputting section 107, and an audio outputting section 108. The control section 101 operates under a program control. The memory 102 stores the program for the control section 101, display information (image data) and the like. Incidentally, examples of the display information include text information, a still image, and a moving image. The wireless communication operating section 103 performs wireless communication. The image capturing section 104 captures a still image and a moving image (video image) and converts them into digital signals. For example, the image capturing section 104 includes a CCD camera. The displaying section 105 displays images and text information (characters). For example, the displaying section 105 includes a LCD. The operating section 106 includes a numeric keypad and various functional keys. The voice inputting section 107 is composed of a microphone for voice communication to input therein voice, etc. The audio outputting section 108 is comprised of a receiver and a speaker(s) to output audio (voice, sound, etc.).

Figure 4:
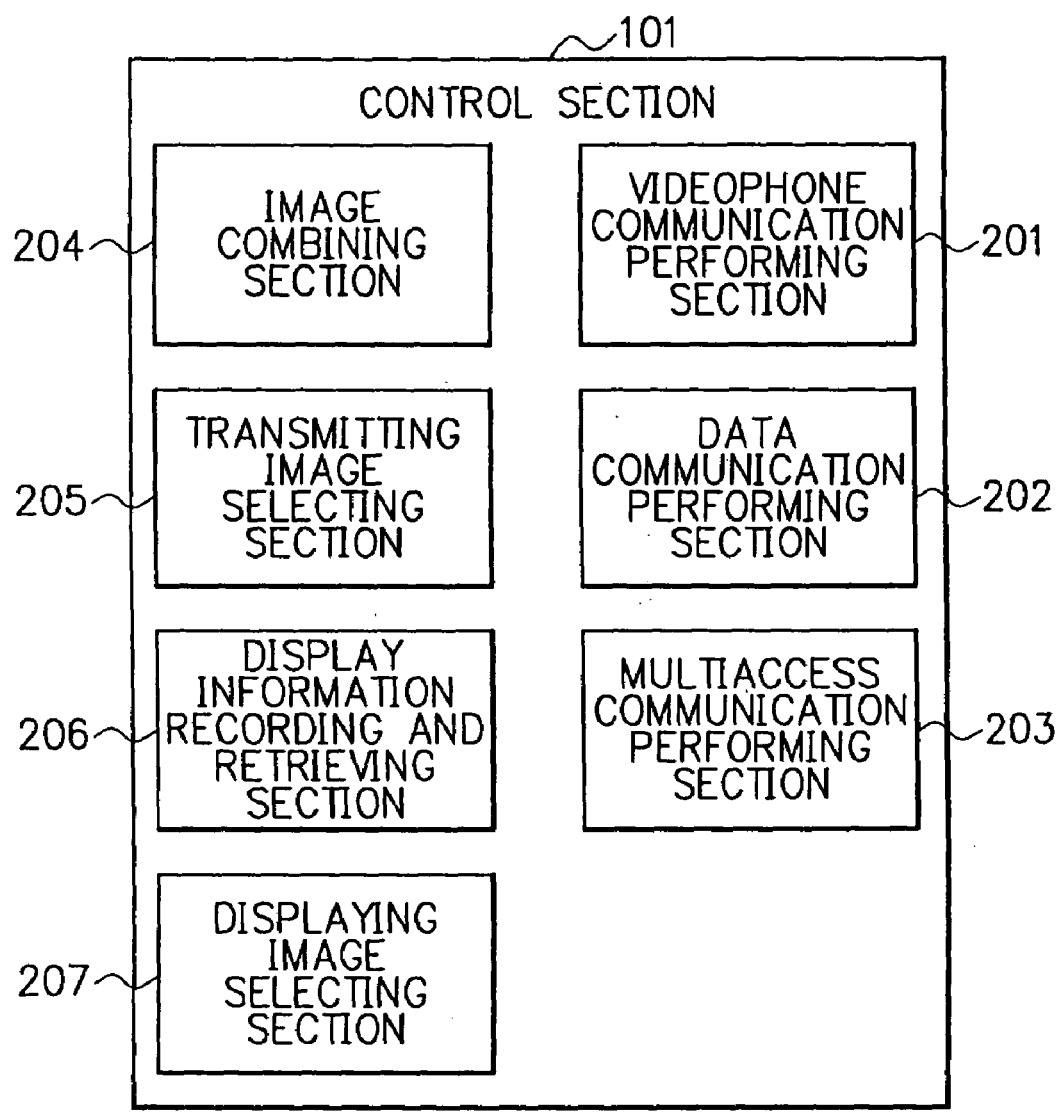
FIG. 4 is a block diagram showing a configuration of a control section of the mobile videophone terminal according to the embodiment.

FIG. 4 is a block diagram showing a detail configuration of the control section 101. The control section 101 of the embodiment comprises a videophone communication performing section 201, a data communication performing section 202, a multiaccess communication performing section 203, an image combining section 204, a transmitting image selecting section 205, a display information recording and retrieving section 206, and a displaying image selecting section 207.

The videophone communication performing section 201 receives from a receiving terminal display information such as a moving image of the calling party, etc. to perform videophone communication. The data communication performing section 202 connects to a base station through a network, etc. for data communication so as to access Web sites to retrieve desired display information such as text information, a still image and a moving image on the basis of a predetermined access method. The multiaccess communication performing section 203 simultaneously activates the videophone communication performing section 201 and the data communication performing section 202. The image combining section 204 combines at least two arbitrarily selected from display information A such as a still image or a moving image captured by the image capturing section 104, display information B such as text information and images obtained by the videophone communication performing section 201, display information C such as text information (characters) and images obtained by the data communication performing section 202, and display information D retrieved by the display information recording and retrieving section 206 to obtain display information E (composite image), and outputs the display information E. The transmitting image selecting section 205 selects, in response to the user's operation of the operating section 106, one of or at least two from among the display information A, the display information B, the display information C, the display information D, or the display information E to output the selected display information as a transmitting image. The display information recording and retrieving section 206 records (stores) data obtained by the data communication performing section 202, text information and images (still images and/or moving images) included in the obtained data, and still images and moving images captured by the image capturing section 104 in the memory 102 as display information, and retrieves desired data from the memory 102. The displaying image selecting section 207 selects, in response to the user's operation of the operating section 106, one of the display information A to E, and displays the selected display information on the displaying section 105 as a displaying image.

FIG. 5 is a diagram showing combinations for composite images from the image combining section 204, which are used as transmitting images and displaying images, and outputs from the transmitting image selecting section 205 and the displaying image selecting section 207. According to the embodiment, the image combining section 204 generates display information E and outputs it to the transmitting image selecting section 205 and the displaying image selecting section 207. The examples of the display information E include a composite image (A+B) obtained by combining the display information A such as a still image and a moving image captured by the image capturing section 104 of the own terminal and the displaying information B received through the videophone communication performing section 201 from the other terminal, a composite image (A+C) obtained by combining the display information A and the displaying information C obtained through the data communication performing section 202, and a composite image (A+B+C) obtained by combining the display information A, the display information B and the display information C. The transmitting image selecting section 205 selects one from the plural display information, and transmits it as a transmitting image to the videophone communication performing section 201. The displaying image selecting section 207 selects one from the plural displaying information as a displaying image, and transmits it to the displaying section 105 to control the display style. The selections by the sections 205 and 207 are conducted according to status of use of the mobile videophone terminal.

In the following, an explanation will be given of an operation of the mobile videophone terminal shown in FIGS. 3 to 5 in reference to FIGS. 6 to 8. First, an explanation will be given of videophone communication, data communication and multiaccess communication.

FIGS. 6A to 6C shows examples of display screens of a transmitting mobile videophone terminal according to the embodiment.

When performing videophone communication with a moving image and voice, on the side of the transmitting terminal, an image captured by the image capturing section 104 and voice input through the voice inputting section 107 are multiplexed under the control of the control section 101 and transmitted to a receiving terminal. On the side of the receiving terminal, the received signals are demultiplexed to obtain the original moving image and voice. The image is displayed on the displaying section 105, and the voice is output from the audio outputting section 108. Incidentally, the operations in connection with videophone communication may be conducted in response to the operation of the operating section 106.

The display screen of the transmitting mobile videophone terminal is the same as that of an ordinary videophone terminal. In this case, a receiving screen 305 from the receiving terminal is full-screen displayed on the displaying section 105. In addition, a small transmitting image 304 captured by the image capturing section 104 of the transmitting terminal is superimposed on the receiving screen 305 as shown in FIG. 6A. By this means, a videophone communication screen 306 is obtained.

When performing data communication, text information and images (a still image and/or a moving image) are received under the control of the control section 101, and displayed on the displaying section 105 as a displaying image. On the side of the transmitting mobile videophone terminal, the displaying information obtained through the data communication is full-screen displayed as the data-communication screen 307 as shown in FIG. 6B. Incidentally, the operations in connection with data communication may be conducted in response to the operation of the operating section 106.

When performing multiaccess communication, the multiaccess communication performing section 203 simultaneously activates the videophone communication performing section 201 and the data communication performing section 202 to have them conduct the above-described operations, respectively. On the side of the transmitting mobile videophone terminal, the videophone communication screen 306 and the data-communication screen 307 are split-screen displayed in parallel as shown in FIG. 6C.

Figure 7A:
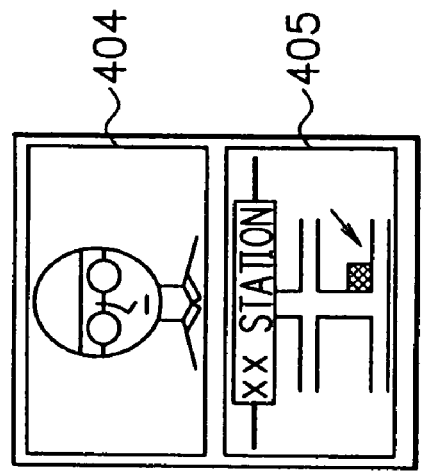
FIGS. 7A to 7C are diagrams each showing an example of a transmitting image transmitted from a transmitting mobile videophone terminal according to the embodiment.
Figure 7B:
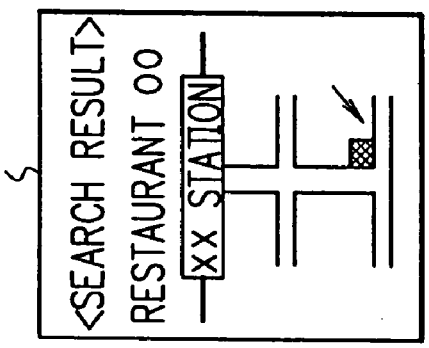
Figure 7C:
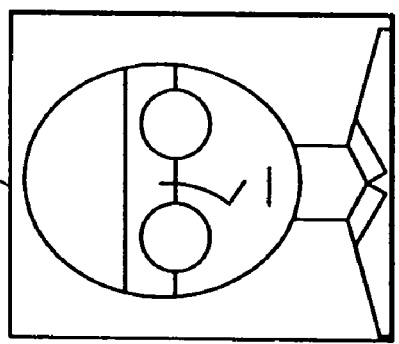

FIGS. 7A to 7C shows examples of transmitting images transmitted from the transmitting mobile videophone terminal according to the embodiment of the present invention.

FIG. 7A shows an example of a transmitting image transmitted from the transmitting mobile-videophone terminal when normally performing videophone communication. The videophone transmitting image 404 of FIG. 7A is an image captured by the image capturing section 104 and transmitted to the receiving terminal. The image and characters in the data-communication transmitting image 405 of FIG. 7B are being obtained through data communication in parallel with the videophone communication, and transmitted to the receiving terminal. These different kinds of communications are realized by the multiaccess communication performing section 203 simultaneously activating the videophone communication performing section 201 and the data communication performing section 202. The videophone transmitting image 404 and the data-communication transmitting image 405 shown in FIGS. 7A and 7B, respectively, may be combined by the image combining section 204 and transmitted to the receiving terminal as a single transmitting image as shown in FIG. 7C.

Figure 8A:
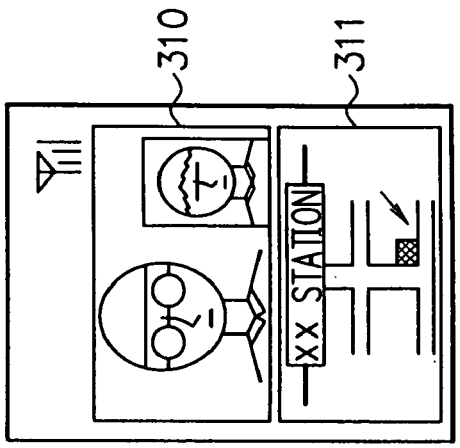
FIGS. 8A to 8C are diagrams each showing an example of a display screen of a receiving mobile videophone terminal according to the embodiment.
Figure 8B:
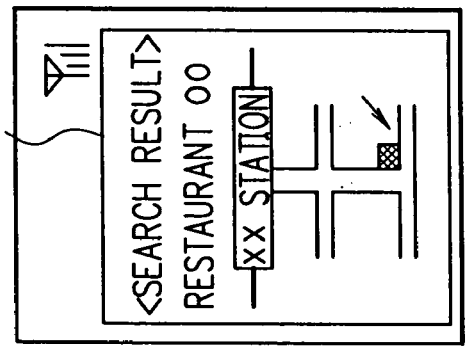
Figure 8C:
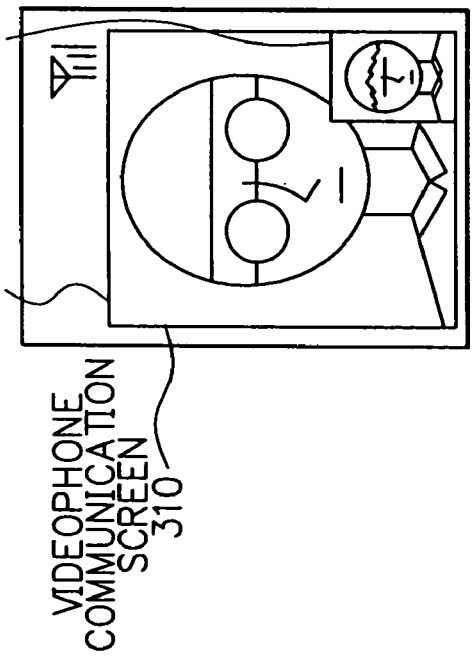

FIGS. 8A to 8C shows examples of display screens of the receiving terminal. The receiving terminal receives the videophone transmitting image 404 shown in FIG. 7A and full-screen displays it as a receiving screen 309 as shown in FIG. 8A. Simultaneously, a transmitting screen 308 captured by the image capturing section 104 of the receiving terminal is superimposed on the receiving screen 309 as shown in FIG. 8A. By this means, the videophone communication screen 310 is obtained. When receiving the data-communication transmitting image 405 shown in FIG. 7B, the image 405 is directly fed into the displaying section 105 of the receiving terminal and displayed as the data-communication screen 311 as shown in FIG. 8B. When receiving the transmitting image shown in FIG. 7C (in which the images 404 and 405 are split-screen displayed in parallel), the transmitting screen 308 captured by the image capturing section 104 of the receiving terminal is superimposed on the videophone transmitting image 404 to be displayed as shown in FIG. 8C. Accordingly, since the display information obtained through data communication is displayed on the transmitting and receiving terminals in real time, it becomes possible to share the information obtained while performing multiaccess communication.

By the above-described operation, while performing video communication (talking on the videophone with each other), one of the talking parties can access and obtain various data through a network such as the Internet when necessary, and transmit the obtained data to the other party in real time. Incidentally, a user of the transmitting mobile videophone terminal can arbitrarily determine a transmitting image, a receiving image, and the display style. This may be preset or set while talking on the videophone by inputting directions through the operating section 106 to control the transmitting image selecting section 205, the displaying image selecting section 207 and the like.

In the following, an explanation will be given of another embodiment of the present invention.

In the above embodiment, the display information obtained through data communication is transmitted as a transmitting image and displayed on the receiving terminal in real time by multiaccess (multitask) function. On the other hand, it is also possible to use information such as text information, a still image and a moving image that has already been stored in the memory 102 as a transmitting image. In this case, the display information recording and retrieving section 206 reads out desired information from the memory 102. The other operations are the same as those described in the foregoing embodiment.

FIG. 9 is a diagram showing the operation of this embodiment. In this embodiment, the display information D retrieved by the display information recording and retrieving section 206 from the memory 102 is output to the image combining section 204, the transmitting image selecting section 205 and the displaying image selecting means 207. The image combining section 204 creates a composite image using the display information A, B C and/or D to generate display information E. The transmitting image selecting section 205 and the displaying image selecting section 207 select a transmitting image to the receiving end and a displaying image for the own terminal, respectively. Incidentally, the transmitting image and the displaying image may be selected on the basis of the instructions input through the operating section 106 by the user.

Incidentally, a mobile video-phone terminal according to the present invention has a mail function of composing a mail and attaching an image (a still image or a moving image) thereto. The "Mail function" realizes an exchange of e-mails and the other kind of mails, for example, a mail that can be exchanged between mobile terminals manufactured by the same mobile-phone company.

As set forth hereinbefore, according to the present invention, various information can be received through data communication while performing videophone communication using the multiaccess function. Further, the information thus received can be transmitted to the other party during the videophone communication, and such information can also be received from the other party during the videophone communication. Accordingly, it becomes possible to share the data-communication information in real time while talking with the other party on the videophone using a moving image (or a still image).

Moreover, the receiving terminal is not necessarily provided with the same functions as those included in the mobile videophone terminal of the present invention to receive the information obtained through the data communication. Further, it becomes possible to save the receiving terminal's trouble of, for example, retrieving the data identical to that the transmitting mobile videophone terminal has retrieved after finishing the phone call. Accordingly, it becomes possible to easily share the information obtained through the data communication with each other.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A mobile videophone terminal that performs video communication using at least one of a still image and a moving image, comprising:
    an image capturing section that captures a first display information;
    a videophone communication performing section that receives second display information from a receiving end in the video communication to perform videophone communication;
    a data communication performing section that receives third display information through a predetermined base station;
    an image combining section that generates fourth display information by combining the first, second and third display information, and that generates a fifth display information by combining the first and third display information;
    a transmitting image selecting section that transmits the fifth display information as a transmitting image to the receiving end; and
    a displaying image selecting section that displays the fourth display information as a displaying image.

2. A mobile videophone terminal as claimed in claim 1, further comprising:
    a multi-access communication performing section that simultaneously activates the videophone communication performing section and the data communication performing section.

3. A mobile videophone terminal as claimed in claim 1, further comprising:
    a memory that stores sixth display information, wherein:
    the image combining section further uses the sixth display information to generate the fourth display information;
    the transmitting image selecting section further inputs therein the sixth display information to select and transmit at least one of the display information as a transmitting image to the receiving end; and
    the displaying image selecting section selects and displays one of the first to sixth display information as a displaying image.

4. A mobile videophone terminal as claimed in claim 2, further comprising:
  a memory that stores sixth display information, wherein:
  the image combining section further uses the sixth display information to generate the fourth display information;
  the transmitting image selecting section further inputs therein the sixth display information to select and transmit at least one of the display information as a transmitting image to the receiving end; and
  the displaying image selecting section selects and displays one of the first to sixth display information as a displaying image.

5. A mobile videophone terminal as claimed in claim 1, wherein:
  the first to sixth display information includes at least one of a still image, a moving image, and a text information.

6. A mobile videophone terminal as claimed in claim 2, wherein:
  the first to sixth display information includes at least one of a still image, a moving image, and a text information.

7. A mobile videophone terminal as claimed in claim 3, wherein:
  the first to sixth display information includes at least one of a still image, a moving image, and a text information.

8. A mobile videophone terminal as claimed in claim 4, wherein:
  the first to sixth display information includes at least one of a still image, a moving image, and a text information.

9. A mobile videophone terminal as claimed in claim 1, wherein:
  while the video communication is being performed, the third display information is obtained through data communication and transmitted as a transmitting image to the receiving end.

10. A mobile videophone terminal as claimed in claim 2, wherein:
  while the video communication is being performed, the third display information is obtained through data communication and transmitted as a transmitting image to the receiving end.

11. A mobile videophone terminal as claimed in claim 3, wherein:
  while the video communication is being performed, the third display information is obtained through data communication and transmitted as a transmitting image to the receiving end.

12. A mobile videophone terminal as claimed in claim 4, wherein:
  while the video communication is being performed, the third display information is obtained through data communication and transmitted as a transmitting image to the receiving end.

13. A mobile videophone terminal as claimed in claim 1, wherein:
  the third display information obtained through data communication during the video communication is combined with the first display information that is being captured by the transmitting mobile videophone terminal, and transmitted as a transmitting image to the receiving end.

14. A mobile videophone terminal as claimed in claim 2, wherein:
  the third display information obtained through data communication during the video communication is combined with the first display information that is being captured by the transmitting mobile videophone terminal, and transmitted as a transmitting image to the receiving end.

15. A mobile videophone terminal as claimed in claim 3, wherein:
  the third display information obtained through data communication during the video communication is combined with the first display information that is being captured by the transmitting mobile videophone terminal, and transmitted as a transmitting image to the receiving end.

16. A mobile videophone terminal as claimed in claim 4, wherein:
  the third display information obtained through data communication during the video communication is combined with the first display information that is being captured by the transmitting mobile videophone terminal, and transmitted as a transmitting image to the receiving end.

17. A mobile videophone terminal as claimed in claim 1, wherein at least one of:
  while the video communication is being performed, the third display information is obtained through data communication and transmitted as a transmitting image to the receiving end; and
  the sixth display information that has been stored in the mobile videophone terminal is transmitted as a transmitting image to the receiving end.

18. A mobile videophone terminal as claimed in claim 2, wherein at least one of:
  while the video communication is being performed, the third display information is obtained through data communication and transmitted as a transmitting image to the receiving end; and
  the sixth display information that has been stored in the mobile videophone terminal is transmitted as a transmitting image to the receiving end.

19. A mobile videophone terminal as claimed in claim 3, wherein at least one of:
  while the video communication is being performed, the third display information is obtained through data communication and transmitted as a transmitting image to the receiving end; and
  the sixth display information that has been stored in the mobile videophone terminal is transmitted as a transmitting image to the receiving end.

20. A mobile videophone terminal as claimed in claim 4, wherein at least one of:
  while the video communication is being performed, the third display information is obtained through data communication and transmitted as a transmitting image to the receiving end; and
  the sixth display information that has been stored in the mobile videophone terminal is transmitted as a transmitting image to the receiving end.

21. A mobile videophone terminal as claimed in claim 1, wherein at least one of:
  the third display information obtained through data communication during the video communication is combined with the first display information that are being captured by the transmitting mobile videophone terminal, and transmitted as a transmitting image to the receiving end; and the sixth display information that has been stored in the mobile videophone terminal is transmitted as a transmitting image to the receiving end.

22. A mobile videophone terminal as claimed in claim 2, wherein at least one of:

the third display information obtained through data communication during the video communication is combined with the first display information that are being captured by the transmitting mobile videophone terminal, and transmitted as a transmitting image to the receiving end; and the sixth display information that has been stored in the mobile videophone terminal is transmitted as a transmitting image to the receiving end.

23. A mobile videophone terminal as claimed in claim 3, wherein at least one of:

the third display information obtained through data communication during the video communication is combined with the first display information that are being captured by the transmitting mobile videophone terminal, and transmitted as a transmitting image to the receiving end; and the sixth display information that has been stored in the mobile videophone terminal is transmitted as a transmitting image to the receiving end.

24. A mobile videophone terminal as claimed in claim 4, wherein at least one of:

the third display information obtained through data communication during the video communication is combined with the first display information that are being captured by the transmitting mobile videophone terminal, and transmitted as a transmitting image to the receiving end; and the sixth display information that has been stored in the mobile videophone terminal is transmitted as a transmitting image to the receiving end.

25. A mobile videophone terminal as claimed in claim 1, wherein at least one of:

while the video communication is being performed, the third display information is obtained through data communication and transmitted as a transmitting image to the receiving end; and the sixth display information that has been stored in the mobile videophone terminal is combined with the first display information that is being captured by the transmitting mobile videophone terminal, and transmitted as a transmitting image to the receiving end.

26. A mobile videophone terminal as claimed in claim 2, wherein at least one of:

while the video communication is being performed, the third display information is obtained through data communication and transmitted as a transmitting image to the receiving end; and the sixth display information that has been stored in the mobile videophone terminal is combined with the first display information that is being captured by the transmitting mobile videophone terminal, and transmitted as a transmitting image to the receiving end.

27. A mobile videophone terminal as claimed in claim 3, wherein at least one of:

while the video communication is being performed, the third display information is obtained through data communication and transmitted as a transmitting image to the receiving end; and the sixth display information that has been stored in the mobile videophone terminal is combined with the first display information that is being captured by the transmitting mobile videophone terminal, and transmitted as a transmitting image to the receiving end.

28. A mobile videophone terminal as claimed in claim 4, wherein at least one of:

while the video communication is being performed, the third display information is obtained through data communication and transmitted as a transmitting image to the receiving end; and the sixth display information that has been stored in the mobile videophone terminal is combined with the first display information that is being captured by the transmitting mobile videophone terminal, and transmitted as a transmitting image to the receiving end.

29. A mobile videophone terminal as claimed in claim 1, wherein at least one of:

the third display information obtained through data communication during the video communication is combined with the first display information that are being captured by the transmitting mobile videophone terminal, and transmitted as a transmitting image to the receiving end; and the sixth display information that has been stored in the mobile videophone terminal is combined with the first display information that is being captured by the transmitting mobile videophone terminal, and transmitted as a transmitting image to the receiving end.

30. A mobile videophone terminal as claimed in claim 2, wherein at least one of:

the third display information obtained through data communication during the video communication is combined with the first display information that are being captured by the transmitting mobile videophone terminal, and transmitted as a transmitting image to the receiving end; and the sixth display information that has been stored in the mobile videophone terminal is combined with the first display information that is being captured by the transmitting mobile videophone terminal, and transmitted as a transmitting image to the receiving end.

31. A mobile videophone terminal as claimed in claim 3, wherein at least one of:

the third display information obtained through data communication during the video communication is combined with the first display information that are being captured by the transmitting mobile videophone terminal, and transmitted as a transmitting image to the receiving end; and the sixth display information that has been stored in the mobile videophone terminal is combined with the first display information that is being captured by the transmitting mobile videophone terminal, and transmitted as a transmitting image to the receiving end.

32. A mobile videophone terminal as claimed in claim 4, wherein at least one of:

the third display information obtained through data communication during the video communication is combined with the first display information that are being captured by the transmitting mobile videophone terminal, and transmitted as a transmitting image to the receiving end; and the sixth display information that has been stored in the mobile videophone terminal is combined with the first display information that is being captured by the transmitting mobile videophone terminal, and transmitted as a transmitting image to the receiving end.

33. A mobile videophone terminal as claimed in claim 1, wherein:
while the video communication is being performed, the third display information is obtained through data communication and transmitted as a transmitting image to the receiving end; and
the mobile videophone terminal further includes a function of arbitrarily determining whether to transmit the third display information.

34. A mobile videophone terminal as claimed in claim 2, wherein:
while the video communication is being performed, the third display information is obtained through data communication and transmitted as a transmitting image to the receiving end; and
the mobile videophone terminal further includes a function of arbitrarily determining whether to transmit the third display information.

35. A mobile videophone terminal as claimed in claim 3, wherein:
while the video communication is being performed, the third display information is obtained through data communication and transmitted as a transmitting image to the receiving end; and
the mobile videophone terminal further includes a function of arbitrarily determining whether to transmit the third display information.

36. A mobile videophone terminal as claimed in claim 4, wherein:
while the video communication is being performed, the third display information is obtained through data communication and transmitted as a transmitting image to the receiving end; and
the mobile videophone terminal further includes a function of arbitrarily determining whether to transmit the third display information.

37. A mobile videophone terminal as claimed in claim 1, wherein:
the third display information obtained through data communication during the video communication is combined with the first display information that are being captured by the transmitting mobile videophone terminal, and transmitted as a transmitting image to the receiving end; and
the mobile videophone terminal further includes a function of arbitrarily determining whether to transmit the third display information.

38. A mobile videophone terminal as claimed in claim 2, wherein:
the third display information obtained through data communication during the video communication is combined with the first display information that are being captured by the transmitting mobile videophone terminal, and transmitted as a transmitting image to the receiving end; and
the mobile videophone terminal further includes a function of arbitrarily determining whether to transmit the third display information.

39. A mobile videophone terminal as claimed in claim 3, wherein:
the third display information obtained through data communication during the video communication is combined with the first display information that are being captured by the transmitting mobile videophone terminal, and transmitted as a transmitting image to the receiving end; and
the mobile videophone terminal further includes a function of arbitrarily determining whether to transmit the third display information.

40. A mobile videophone terminal as claimed in claim 4, wherein:
the third display information obtained through data communication during the video communication is combined with the first display information that are being captured by the transmitting mobile videophone terminal, and transmitted as a transmitting image to the receiving end; and
the mobile videophone terminal further includes a function of arbitrarily determining whether to transmit the third display information.

41. A mobile videophone terminal as claimed in claim 1, wherein:
the sixth display information that has been stored in the mobile videophone terminal is transmitted as a transmitting image to the receiving end; and
the mobile videophone terminal further includes a function of arbitrarily determining whether to transmit the sixth display information.

42. A mobile videophone terminal as claimed in claim 2, wherein:
the sixth display information that has been stored in the mobile videophone terminal is transmitted as a transmitting image to the receiving end; and
the mobile videophone terminal further includes a function of arbitrarily determining whether to transmit the sixth display information.

43. A mobile videophone terminal as claimed in claim 3, wherein:
the sixth display information that has been stored in the mobile videophone terminal is transmitted as a transmitting image to the receiving end; and
the mobile videophone terminal further includes a function of arbitrarily determining whether to transmit the sixth display information.

44. A mobile videophone terminal as claimed in claim 4, wherein:
the sixth display information that has been stored in the mobile videophone terminal is transmitted as a transmitting image to the receiving end; and
the mobile videophone terminal further includes a function of arbitrarily determining whether to transmit the sixth display information.

45. A mobile videophone terminal as claimed in claim 1, wherein:
the sixth display information that has been stored in the mobile videophone terminal is combined with the first display information that are being captured by the transmitting mobile videophone terminal, and transmitted as a transmitting image to the receiving end; and
the mobile videophone terminal further includes a function of arbitrarily determining whether to transmit the combined display information.

46. A mobile videophone terminal as claimed in claim 2, wherein:
the sixth display information that has been stored in the mobile videophone terminal is combined with the first display information that are being captured by the transmitting mobile videophone terminal, and transmitted as a transmitting image to the receiving end; and the mobile videophone terminal further includes a function of arbitrarily determining whether to transmit the combined display information.

47. A mobile videophone terminal as claimed in claim 3, wherein:

the sixth display information that has been stored in the mobile videophone terminal is combined with the first display information that are being captured by the transmitting mobile videophone terminal, and transmitted as a transmitting image to the receiving end; and the mobile videophone terminal further includes a function of arbitrarily determining whether to transmit the combined display information.

48. A mobile videophone terminal as claimed in claim 4, wherein:

the sixth display information that has been stored in the mobile videophone terminal is combined with the first display information that are being captured by the transmitting mobile videophone terminal, and transmitted as a transmitting image to the receiving end; and the mobile videophone terminal further includes a function of arbitrarily determining whether to transmit the combined display information.

\* \* \* \* \*